United States Patent
Yang et al.

(10) Patent No.: US 11,937,253 B2
(45) Date of Patent: Mar. 19, 2024

(54) METHOD FOR DETERMINING SCHEDULING PARAMETER, METHOD FOR CONFIGURING SCHEDULING PARAMETER, TERMINAL, AND NETWORK-SIDE DEVICE

(71) Applicant: VIVO MOBILE COMMUNICATION CO., LTD., Chang'an Dongguan (CN)

(72) Inventors: Yu Yang, Chang'an Dongguan (CN); Peng Sun, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 456 days.

(21) Appl. No.: 17/146,915

(22) Filed: Jan. 12, 2021

(65) Prior Publication Data

US 2021/0136808 A1    May 6, 2021

Related U.S. Application Data

(63) Continuation of application No. PCT/CN2019/094522, filed on Jul. 3, 2019.

(30) Foreign Application Priority Data

Jul. 12, 2018 (CN) .......................... 201810762971.8

(51) Int. Cl.
  *H04W 72/23* (2023.01)
  *H04W 8/24* (2009.01)
  *H04W 72/12* (2023.01)

(52) U.S. Cl.
  CPC ............. *H04W 72/23* (2023.01); *H04W 8/24* (2013.01); *H04W 72/12* (2013.01)

(58) Field of Classification Search
  CPC ..... H04L 5/001; H04L 5/0023; H04L 5/0044; H04L 5/0053; H04L 5/0094;
  (Continued)

(56) References Cited

U.S. PATENT DOCUMENTS 10,813,116 B2 * 10/2020 Chatterjee ............. H04L 1/1812
10,887,906 B2 *  1/2021 Ang ....................... H04W 80/02
(Continued)

FOREIGN PATENT DOCUMENTS

CA    3082701 A1 *  5/2019 ........... H04L 1/0006
CN   103874096 A    6/2014
(Continued)

OTHER PUBLICATIONS

Japanese Notice of Reasons for Refusal for related Application No. 2021-500944; reported on Dec. 21, 2021.
(Continued)

*Primary Examiner* — Eric Nowlin
(74) *Attorney, Agent, or Firm* — von Briesen & Roper, s.c.

(57) ABSTRACT

Some embodiments of this disclosure provide a method for determining a scheduling parameter, a method for configuring a scheduling parameter, a terminal, and a network-side device. The method for determining a scheduling parameter is applied to a terminal and includes: determining a scheduling offset threshold for current use according to a preset rule when a carrier or BWP on which a PDCCH is located and a carrier or BWP on which a PDSCH scheduled by the PDCCH is located have different numerologies.

16 Claims, 7 Drawing Sheets

(58) Field of Classification Search
CPC .............. H04L 27/26025; H04W 8/24; H04W 72/0453; H04W 72/046; H04W 72/12; H04W 72/1273; H04W 72/23; H04W 72/53
See application file for complete search history.

(56) References Cited

U.S. PATENT DOCUMENTS

| | | | | |
|---|---|---|---|---|
| 11,206,099 | B2* | 12/2021 | Shen | ............... H04L 5/0094 |
| 2016/0119946 | A1 | 4/2016 | Dai et al. | |
| 2018/0070192 | A1 | 3/2018 | Lee et al. | |
| 2019/0149365 | A1* | 5/2019 | Chatterjee | ............ H04L 25/0226 370/329 |
| 2019/0289622 | A1* | 9/2019 | Chatterjee | ............ H04W 72/20 |
| 2020/0280388 | A1* | 9/2020 | Shen | ............... H04L 5/0007 |
| 2021/0029684 | A1* | 1/2021 | Shen | ............... H04L 5/0094 |
| 2021/0112563 | A1* | 4/2021 | Hua | ............... H04L 5/0044 |
| 2021/0136808 | A1* | 5/2021 | Yang | ............... H04W 72/12 |
| 2021/0400699 | A1* | 12/2021 | Nory | ............... H04W 72/0446 |
| 2022/0094465 | A1* | 3/2022 | Shen | ............... H04L 5/0082 |
| 2022/0141690 | A1* | 5/2022 | Wu | ............... H04L 5/0094 370/329 |
| 2022/0150947 | A1* | 5/2022 | Shen | ............... H04W 72/23 |
| 2022/0353893 | A1* | 11/2022 | Choi | ............... H04L 5/0053 |
| 2022/0417970 | A1* | 12/2022 | Shubhi | ............... H04L 5/0048 |
| 2023/0319708 | A1* | 10/2023 | Ma | ............... H04W 8/24 455/574 |

FOREIGN PATENT DOCUMENTS

| | | | | | |
|---|---|---|---|---|---|
| CN | 110710294 | A | * | 1/2020 | ............ H04L 1/0006 |
| CN | 110710294 | B | * | 11/2020 | ............ H04L 1/0006 |
| CN | 112260813 | A | * | 1/2021 | ............ H04L 1/0006 |
| EP | 3713331 | B1 | * | 5/2023 | ............ H04L 1/0006 |
| JP | 2021510019 | A | * | 4/2021 | |
| JP | 7213243 | B2 | * | 1/2023 | ............ H04L 1/0006 |
| KR | 20200087181 | A | | 7/2020 | |
| RU | 2748359 | C1 | * | 5/2021 | ............ H04L 1/0006 |

OTHER PUBLICATIONS

Interdigital, Inc., "Remaining issues on beam management", Nov. 27-Dec. 1, 2017, 3GPP TSG RAN WG1 Meeting #91, Reno, USA, R1-1720630.

Vivo, "Remaining issues on beam measurement and reporting", Apr. 16-20, 2018, 3GPP TSG RAN WG1 Meeting #92bis, Sanya, China, R1-1803817.

Mediatek Inc., "Remaining issues of DLUL scheduling and HARQ management", May 21-25, 2018, 3GPP TSG RAN WG1 Meeting #93, Busan, Korea, R1-1806801.

Chinese Office Action for related Application No. 201810762971.8; reported on Apr. 27, 2021.

Catt, "Scheduling and HARQ support for NR CA", Aug. 21-25, 2017, 3GPP TSG RAN WG1 RAN1#90, Prague, Czechia.

Samsung, "Issues on beam management", Jan. 22-26, 2018, 3GPP TSG RAN WG1 Meeting AH 1801, Vancouver, Canada.

Huawei, Hisilicon, "Summary of remaining issues on bandwidth part and wideband operation", Feb. 26-Mar. 2, 2018, 3GPP TSG RAN WG1 Meeting #92, Athens, Greece.

Extended European Search Report for related Application No. 19833599.4; reported on Aug. 25, 2021.

Fujitsu, "Ambiguities about beam indication in some cases", Jan. 22-26, 2018, 3GPP TSG RAN WG1 Meeting #Ad-hoc, Vancouver, Canada.

Samsung, "Corrections on Beam Reporting and Indication", Feb. 26-Mar. 2, 2018, 3GPP TSG RAN WG1 Meeting #92, Athens, Greece.

Intel Corporation, "Summary of simultaneous transmission and reception of channels/signals", Apr. 16-20, 2018, 3GPP TSG RAN WG1 Meeting #92bis, Sanya, China.

South Korean Request for the Submission of an Opinion for related Application No. 10-2021-7003367; reported on Dec. 13, 2023.

3rd Generation Partnership Project, "Technical Specification Group Radio Access Network; NR; User Equipment (UE) radio access capabilities", 3GPP A Global Initiative, Release 15, Jun. 2018, 3GPP TS 38.306 V15.2.0.

* cited by examiner

Determine a scheduling offset threshold for current use according to a preset rule when a carrier or BWP on which a PDCCH is located and a carrier or BWP on which a PDSCH scheduled by the PDCCH is located have different numerologies — 21

METHOD FOR DETERMINING SCHEDULING PARAMETER, METHOD FOR CONFIGURING SCHEDULING PARAMETER, TERMINAL, AND NETWORK-SIDE DEVICE

CROSS-REFERENCE TO RELATED APPLICATIONS

The present application is a continuation application of International Application No. PCT/CN2019/094522 filed on Jul. 3, 2019, which claims priority of Chinese Patent Application No. 201810762971.8 in China on Jul. 12, 2018, both of which are incorporated herein by reference in their entireties.

TECHNICAL FIELD

Some embodiments of this disclosure relate to the field of wireless communications technologies, and in particular, to a method for determining a scheduling parameter, a method for configuring a scheduling parameter, a terminal, and a network-side device.

BACKGROUND

With development of communication technologies, communication efficiency has attracted increasing attention. The following describes several techniques for improving the communication efficiency.

1. Multi-Antenna

Radio access technology standards such as long term evolution (Long Term Evolution, LTE for short)/LTE-Advanced (LTE-Advanced, LTE-A for short) are built based on multiple-input multiple-output (Multiple-Input Multiple-Output, MIMO for short) and orthogonal frequency division multiplexing (Orthogonal Frequency Division Multiplexing, OFDM for short) technologies. In the MIMO technology, spatial freedom obtained by the multi-antenna system is used to improve the peak rate and system spectrum utilization. It is predictable that in the future 5G mobile communications system, the massive MIMO technology with more antenna ports is to be introduced. The massive (Massive) MIMO technology uses massive antenna arrays to greatly improve the system frequency band utilization and support a larger quantity of access users.

If an all-digital array is used in the massive MIMO technology, maximized spatial resolution and optimal multi-user MIMO (Multi-User MIMO, MU-MIMO for short) performance can be achieved. However, this structure requires a large number of analog-to-digital/digital-to-analog (AD/DA) converters and a large number of complete radio frequency-baseband processing channels, imposing a huge burden on both device costs and baseband processing complexity.

In order to avoid the aforementioned implementation costs and device complexity, the digital-analog hybrid beamforming technology emerges, that is, on the basis of conventional digital beamforming, one more stage of beamforming is applied to radio frequency signals near a front end of an antenna system. With analog beamforming, transmit signals and channels can be roughly matched in a relatively simple manner. The quantity of equivalent channels formed through analog beamforming is smaller than an actual quantity of antennas, so that a quantity of required AD/DA converters, a quantity of digital channels, and corresponding baseband processing complexity can be greatly reduced. Residual interference resulting from analog beamforming can be further processed in the digital domain to ensure MU-MIMO transmission quality. Compared with all-digital beamforming, digital-analog hybrid beamforming is a compromise scheme in terms of performance and complexity, and has a higher practical prospect in a high-frequency or large-bandwidth system or a system with a large number of antennas.

2. Beam Measurement and Reporting (Beam Measurement and Beam Reporting)

Analog beamforming is based on full-bandwidth transmission, and an antenna element of each polarization direction on a panel of each high-frequency antenna array can transmit analog beams only in a time-division multiplexing manner. A beamforming weight of the analog beam is implemented by adjusting parameters of devices such as a phase shifter on the radio frequency front-end.

At present, in the academia and industrial fields, a polling manner is typically used for training of analog beamforming vectors, that is, the antenna element of each polarization direction of each antenna panel sends a training signal (that is, a candidate beamforming vector) sequentially at agreed times in a time-division multiplexing manner. A terminal feeds back a beam report after measurement, so that the network side can use the training signal to implement analog beam transmission for transmitting a next service. Content of the beam report generally includes identifiers of several optimal transmit beams and a measured received power of each transmit beam.

3. Bandwidth Part (Bandwidth Part, BWP for Short)

In NR Release 15, a maximum channel bandwidth (Channel Bandwidth) of each carrier is 400 MHz. However, considering terminal (User Equipment, UE for short) capability, a maximum UE-supported bandwidth may be less than 400 MHz, and UE may also work on a plurality of small BWPs. Each bandwidth part corresponds to one numerology (Numerology), bandwidth (bandwidth), and frequency location (frequency location).

4. Beam Indication (Beam Indication) Mechanism

In the related art, the network side configures a correspondence between transmission configuration indication (Transmission Configuration Indication, TCI for short) states and reference signals (Reference Signal, RS for short) for the UE by using radio resource control (Radio Resource Control, RRC for short) signaling.

When the TCI is used for quasi co-location (Quasi-colocation, QCL for short) indication of a physical downlink control channel (Physical Downlink Control Channel, PDCCH for short), the UE may learn, based on the TCI state, which receive beam is used for receiving the PDCCH.

When the TCI is used for QCL indication of a physical downlink shared channel (Physical Downlink Shared Channel, PDSCH for short), the UE may learn, based on to the TCI state, which receive beam is used for receiving the PDSCH.

During receiving of the PDSCH, a time offset (time offset) for receiving the PDCCH and receiving the PDSCH needs to be compared with a preset scheduling offset threshold (Threshold-Scheduled-Offset); QCL information of the PDSCH is determined based on a comparison result; and then the PDSCH is received based on the QCL information of the PDSCH.

In a multi-carrier system, the network side may perform cross-carrier or cross-BWP scheduling for the UE. However, how the UE determines a scheduling offset threshold when the network side performs cross-carrier or cross-BWP scheduling for the UE has not been proposed in the related art.

SUMMARY

Some embodiments of this disclosure provide a method for determining a scheduling parameter, a method for configuring a scheduling parameter, a terminal, and a network-side device, so as to resolve the problem that a scheduling offset threshold cannot be accurately determined when a network side performs cross-carrier or cross-BWP scheduling for UE.

In order to resolve the foregoing technical problem, this disclosure is implemented as follows:

According to a first aspect, some embodiments of this disclosure provide a method for determining a scheduling parameter, applied to a terminal and including: determining a scheduling offset threshold for current use according to a preset rule when a carrier or BWP on which a PDCCH is located and a carrier or BWP on which a PDSCH scheduled by the PDCCH is located have different numerologies.

According to a second aspect, some embodiments of this disclosure provide a method for configuring a scheduling parameter, applied to a network-side device and including: sending a preset rule to a terminal, so that the terminal determines a scheduling offset threshold for current use according to the preset rule when a carrier or BWP on which a PDCCH is located and a carrier or BWP on which a PDSCH scheduled by the PDCCH is located have different numerologies.

According to a third aspect, some embodiments of this disclosure provide a terminal, including: a first determining module, configured to determine a scheduling offset threshold for current use according to a preset rule when a carrier or BWP on which a PDCCH is located and a carrier or BWP on which a PDSCH scheduled by the PDCCH is located have different numerologies.

According to a fourth aspect, some embodiments of this disclosure provide a network-side device, including: a first sending module, configured to send a preset rule to a terminal, so that the terminal determines a scheduling offset threshold for current use according to the preset rule when a carrier or BWP on which a PDCCH is located and a carrier or BWP on which a PDSCH scheduled by the PDCCH is located have different numerologies.

According to a fifth aspect, some embodiments of this disclosure provide a terminal, including a processor, a memory, and a computer program stored in the memory and capable of running on the processor. When the computer program is executed by the processor, the steps of the method for determining a scheduling parameter described above are implemented.

According to a sixth aspect, some embodiments of this disclosure provide a network-side device, including a processor, a memory, and a computer program stored in the memory and capable of running on the processor. When the computer program is executed by the processor, the steps of the method for configuring a scheduling parameter described above are implemented.

According to a seventh aspect, some embodiments of this disclosure provide a computer-readable storage medium, where a computer program is stored in the computer-readable storage medium. When the computer program is executed by a processor, the steps of the method for determining a scheduling parameter described above are implemented, or when the computer program is executed by the processor, the steps of the method for configuring a scheduling parameter described above are implemented.

In some embodiments of this disclosure, when the carrier or BWP on which the PDCCH received by the terminal is located and the carrier or BWP on which the PDSCH scheduled by the PDCCH is located have different numerologies, that is, the network side performs cross-carrier or cross-BWP scheduling for the terminal, the terminal may determine the scheduling offset threshold for current use according to the preset rule, so as to determine the QCL information of the PDSCH based on the scheduling offset threshold and ensure correct reception of the PDSCH based on the determined QCL information of the PDSCH.

BRIEF DESCRIPTION OF DRAWINGS

Other advantages and benefits will become apparent to those of ordinary skill in the art by reading the following detailed descriptions of optional embodiments. The accompanying drawings are merely intended to illustrate the purposes of the optional embodiments, and should not be construed as a limitation on this disclosure. In addition, throughout the accompanying drawings, the same components are denoted by the same reference numerals. In the accompanying drawings.

DESCRIPTION OF EMBODIMENTS

The following clearly describes the technical solutions in some embodiments of this disclosure with reference to the accompanying drawings in some embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The term "include" or any of its variants in the specification and claims of this application mean to cover the non-exclusive inclusion. For example, a process, a method, a system, a product, or a device that includes a list of steps or units is not necessarily limited to those steps or units, but may include other steps or units not expressly listed or inherent to such process, a method, a system, a product, or a device.

In addition, in the specification and claims, the use of "and/or" represents presence of at least one of the connected objects, for example, "A and/or B" indicates that the following three cases: only A, only B, and both A and B.

In some embodiments of this disclosure, terms such as "exemplary" or "for example" are used to represent an example, an instance, or an illustration. Any embodiment or design scheme described as "exemplary" or "for example" in some embodiments of this disclosure should not be construed as being more preferable or advantageous than other embodiments or design schemes. To be precise, the use of terms such as "exemplary" or "for example" is intended to present a related concept in a specific manner.

The following describes the embodiments of this disclosure with reference to the accompanying drawings. A method for determining a scheduling parameter, a method for configuring a scheduling parameter, a terminal, and a network-side device provided in some embodiments of this disclosure may be applied to a wireless communications system. The wireless communications system may be a 5G system, an evolved long term evolution (Evolved Long Term Evolution, eLTE for short) system, or a later evolved communications system.

Figures 1, 2:
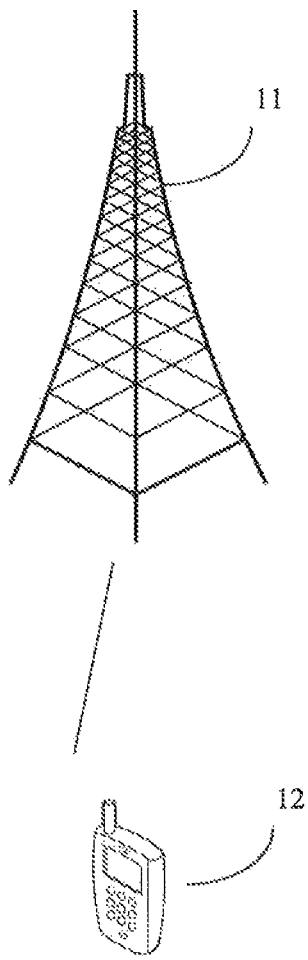
FIG. 1 is a schematic architectural diagram of a wireless communications system according to some embodiments of this disclosure.
FIG. 2 is a schematic flowchart of a method for determining a scheduling parameter according to some embodiments of this disclosure.

FIG. 1 is a schematic architectural diagram of a wireless communications system according to some embodiments of this disclosure. As shown in FIG. 1, the wireless communications system may include a network-side device 11 and a terminal 12. The terminal 12 may be connected to the network-side device 11. In an actual application, connection between the foregoing devices may be wireless connection. To conveniently and intuitively represent a connection relationship between the devices, a solid line is used in FIG. 1.

It should be noted that the foregoing communications system may include a plurality of terminals 12, and the network-side device may communicate with the plurality of terminals 12 (transmitting signaling or data).

The network-side device 11 provided in some embodiments of this disclosure may be a base station, and the base station may be a base station commonly used, or may be an evolved base station (evolved node base station, eNB for short), or may be a device in the 5G system, such as a network-side device (such as a next-generation base station (next generation node base station, gNB for short) or a transmission and reception point (transmission and reception point, TRP for short)) or a cell, or may be a network-side device in a later evolved communications system. The terms do not constitute any limitation thereon.

The terminal 12 provided in some embodiments of this disclosure may be a mobile phone, a tablet computer, a notebook computer, an ultra-mobile personal computer (Ultra-Mobile Personal Computer, UMPC), a netbook, a personal digital assistant (Personal Digital Assistant, PDA), or the like. Persons skilled in the art can understand that the words do not constitute any limitation thereon.

Referring to FIG. 2, FIG. 2 is a schematic flowchart of a method for determining a scheduling parameter according to some embodiments of this disclosure. The method for determining a scheduling parameter is applied to a terminal and includes:

Step 21: Determine a scheduling offset threshold for current use according to a preset rule when a carrier or BWP on which a PDCCH is located and a carrier or BWP on which a PDSCH scheduled by the PDCCH is located have different numerologies.

In some embodiments of this disclosure, the scheduling parameter includes a scheduling offset threshold. Certainly, other parameters may also be included. Only the scheduling offset threshold to be determined is included in some embodiments of this disclosure.

In some embodiments of this disclosure, when the carrier or BWP on which the PDCCH received by the terminal is located and the carrier or BWP on which the PDSCH scheduled by the PDCCH is located have different numerologies, that is, the network side performs cross-carrier or cross-BWP scheduling for the terminal, the terminal may determine the scheduling offset threshold for current use according to the preset rule, so as to determine the QCL information of the PDSCH based on the scheduling offset threshold and ensure correct reception of the PDSCH based on the determined QCL information of the PDSCH.

In some embodiments of this disclosure, when the numerology is configured per carrier (that is, the network configures a same numerology for at least one BWP on a same carrier, where the numerology includes parameters such as a subcarrier spacing (subcarrier spacing, SCS for short) and a cyclic prefix (cyclic prefix, CP for short), and numerology information in this case is included in BWP configuration information; alternatively the network configures numerology information for the carrier and the numerology information in this case is included in carrier configuration information, which is the same below and details are not described again), the preset rule includes:

using a scheduling offset threshold corresponding to the numerology of the carrier on which the PDCCH is located as the scheduling offset threshold for current use; or using a scheduling offset threshold corresponding to the numerology of the carrier on which the PDSCH is located as the scheduling offset threshold for current use; or using a scheduling offset threshold corresponding to a maximum or minimum subcarrier spacing in the numerology of the carrier on which the PDCCH or the PDSCH is located as the scheduling offset threshold for current use.

When the numerology is configured per BWP (that is, the network may configure same or different numerologies for at least one BWP on a same carrier, where the numerology includes parameters such as a subcarrier spacing (subcarrier spacing, SCS for short) and a cyclic prefix (cyclic prefix, CP for short), and in this case, numerology information is included in BWP configuration information, which is the same below and details are not described again), the preset rule includes:

using a scheduling offset threshold corresponding to the numerology of the BWP on which the PDCCH is located as the scheduling offset threshold for current use; or using a scheduling offset threshold corresponding to the numerology of the BWP on which the PDSCH is located as the scheduling offset threshold for current use; or using a scheduling offset threshold corresponding to a maximum or minimum subcarrier spacing in the numerology of the BWP on which the PDCCH or the PDSCH is located as the scheduling offset threshold for current use.

The following briefly describes the BWP on which the terminal operates.

For a frequency division duplexing (Frequency Division Duplexing, FDD for short) system or a paired spectrum (paired spectrum), the network-side device configures a maximum of four downlink BWPs and a maximum of four uplink BWPs for the terminal. For a time division duplexing (Time Division Duplexing, TDD for short) system or an unpaired spectrum (unpaired spectrum), the network-side device configures a maximum of four downlink/uplink (DL/UL) BWP pairs for the terminal. The DL BWP and the UL BWP in each DL/UL BWP pair have a same center carrier frequency. In addition, each UE has a default (default) DL BWP, or a default DL/UL BWP pair. The default DL BWP or default DL/UL BWP pair is usually a BWP with a relatively small bandwidth. When the terminal fails to receive data or detect the PDCCH for a long time, the terminal is switched from a current active (active) BWP to the default DL BWP or default DL/UL BWP pair by using a timer (timer), to achieve a power saving effect. Active-BWP switching is implemented by using RRC or downlink control information (DCI) or a timer. For example, DCI on a first control-resource set (control-resource set, CORESET for short) instructs the terminal to switch to a second CORESET. After the terminal is switched to the second CORESET, a BWP on which the CORESET is located is an active BWP. There are a maximum of three CORESETs on each BWP of each cell.

A CORESET with an ID 0 (CORESET #0) is configured by a physical broadcast channel (Physical Broadcast Channel, PBCH), and is used by the terminal to receive system information (system information). For a broadcast (broadcast) PDCCH, the terminal determines which synchronization signal block (Synchronization Signal Block, SSB) corresponds to a common search space (common search space). A unicast (unicast) PDSCH may be scheduled by DCI associated with the CORESET #0.

In some embodiments of this disclosure, the preset rule is configured by the network-side device or specified by a protocol.

Figure 3:
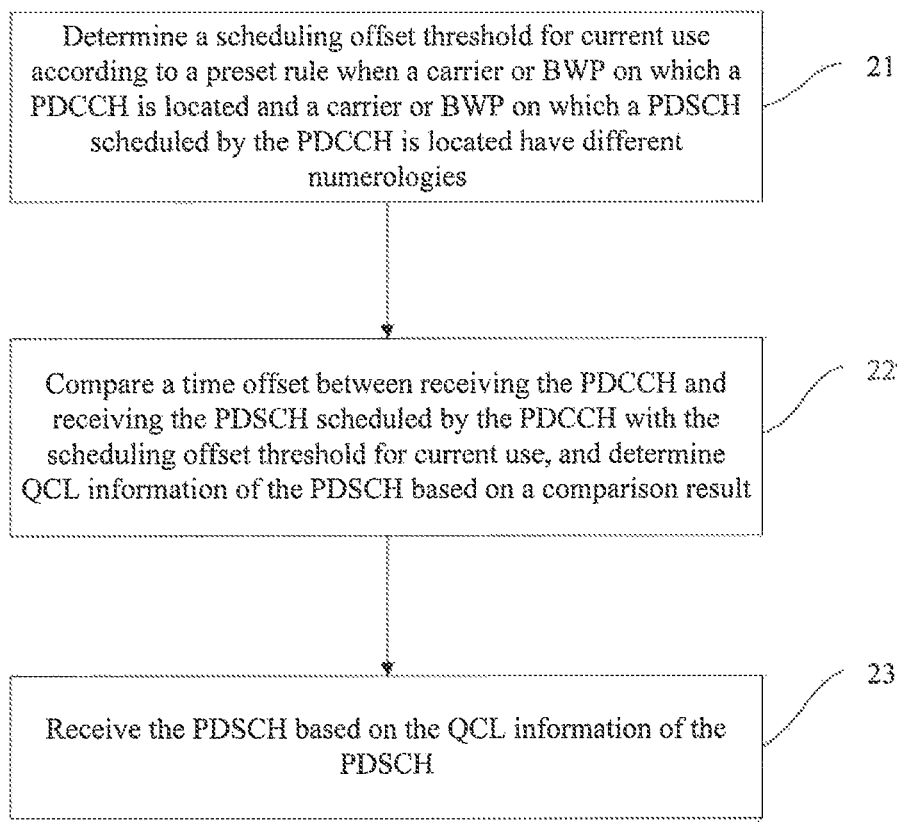
FIG. 3 is a schematic flowchart of a method for determining a scheduling parameter according to another embodiment of this disclosure.

Referring to FIG. 3, after the step of determining a scheduling offset threshold for current use according to a preset rule, the method further includes the following steps.

Step 22: Compare a time offset between receiving the PDCCH and receiving the PDSCH scheduled by the PDCCH with the scheduling offset threshold for current use, and determine QCL information of the PDSCH based on a comparison result.

Step 23: Receive the PDSCH based on the QCL information of the PDSCH.

The network-side device configures a correspondence between TCI states (state) and RSs for the UE by using RRC signaling.

When the TCI is used for QCL indication of the PDCCH, the network-side device configures K TCI states for each control-resource set (control-resource set, CORESET for short). When K>1, one TCI state is indicated by a media access control control element (Media Access Control Control Element, MAC CE); when K=1, no additional MAC CE signaling is required. When listening to a CORESET, the terminal uses same QCL information, that is, a same TCI state, for all search spaces (search space) within the CORESET. An RS resource (such as a channel state information reference signal (Channel State Information Reference Signal, CSI-RS for short) resource, a semi-persistent CSI-RS resource, and a synchronization signal block (SS block)) in a reference signal set (RS set) corresponding to the TCI state is spatially QCLed with a UE-specific PDCCH DMRS (Demodulation Reference Signal, demodulation reference signal) port. The terminal may learn, based on the TCI state, which receive beam is used for receiving the PDCCH.

When the TCI is used for QCL indication of the PDSCH, the network activates $2^N$ TCI states, and notifies the TCI states by using an N-bit TCI field of the downlink control information (DCI). An RS resource in an RS set corresponding to the TCI state is QCLed with a DMRS port of the PDSCH to be scheduled. The terminal may learn, based on the TCI state, which receive beam is used for receiving the PDSCH.

If the time offset (time offset) for receiving the PDCCH and receiving the PDSCH scheduled by the PDCCH is less than the scheduling offset threshold, the terminal determines the QCL information of the PDSCH based on a TCI state of a CORESET with a smallest ID (lowest CORESET-ID) on an active BWP of the serving cell.

If the time offset between receiving the PDCCH and receiving the PDSCH scheduled by the PDCCH is greater than or equal to the scheduling offset threshold, when the PDSCH is scheduled by using DCI format 1_1 and a higher-layer parameter tci-PresentInDCI is configured as enabled (enabled), the terminal assumes that a demodulation reference signal (Demodulation Reference Signal, DMRS for short) port group of the PDSCH is QCLed with an RS in an RS set indicated by the TCI state in the TCI field.

If the time offset between receiving the PDCCH and receiving the PDSCH scheduled by the PDCCH is greater than or equal to the scheduling offset threshold, when the PDSCH is scheduled by using DCI format 1_0, or when the PDSCH is scheduled by using the DCI format 1_1 with no TCI field carried, or when the PDSCH is scheduled by using the DCI format 1_1 and a higher-layer parameter tci-PresentInDCI is configured as disabled, the terminal assumes that the QCL information of the PDSCH is QCL information indicated by a TCI state of a CORESET on which the PDCCH is located.

Figure 4:
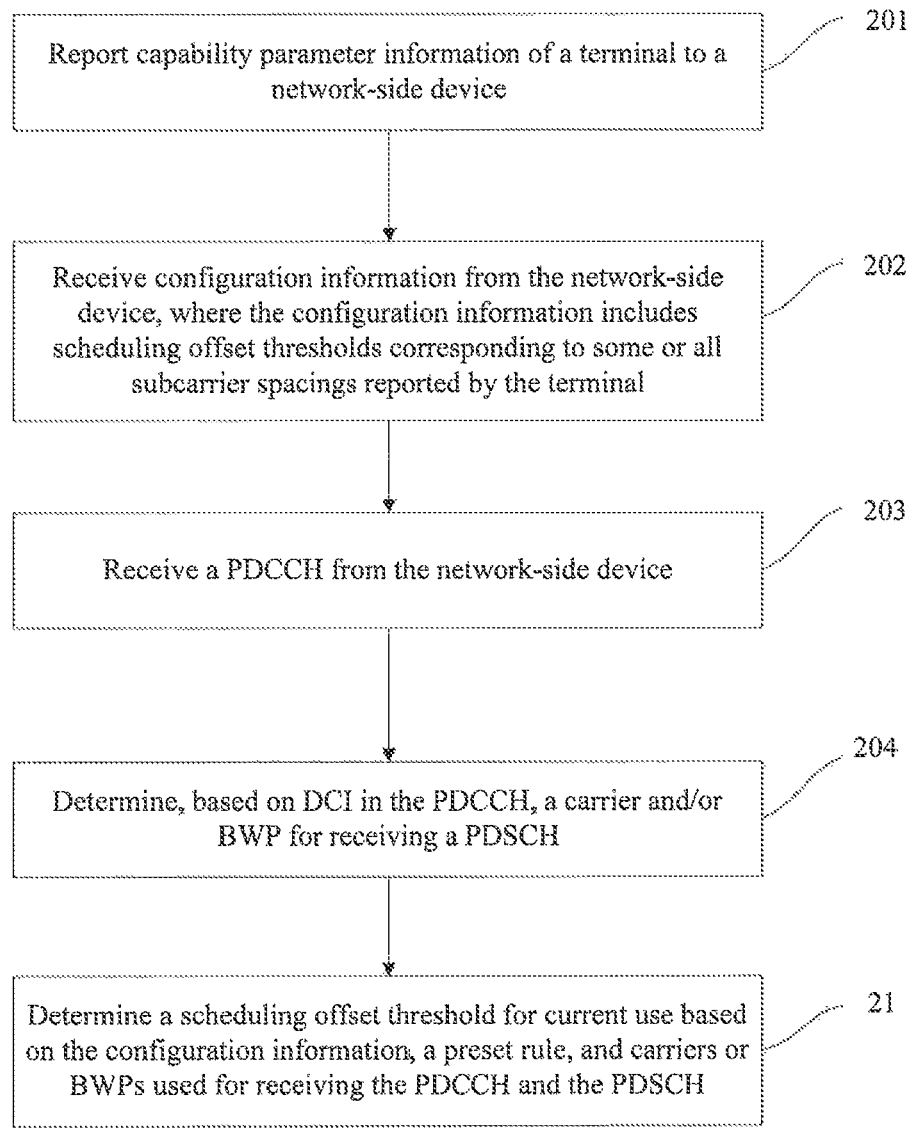
FIG. 4 is a schematic flowchart of a method for determining a scheduling parameter according to still another embodiment of this disclosure.

Referring to FIG. 4, in some embodiments of this disclosure, before the step of determining a scheduling offset threshold for current use according to a preset rule, the method further includes:

Step 201: Report capability parameter information of the terminal to the network-side device, where the capability parameter information includes time offset information corresponding to some or all subcarrier spacings supported by the terminal, and the time offset information is a minimum quantity of symbols required by the terminal to perform PDCCH reception and apply QCL information indicated by DCI in the PDCCH for the PDSCH scheduled by the PDCCH.

Step 202: Receive configuration information from the network-side device, where the configuration information includes a scheduling offset threshold corresponding to a subcarrier spacing reported by the terminal, and the scheduling offset threshold is obtained based on the time offset information.

Step 203: Receive the PDCCH from the network-side device, where the carrier and/or BWP on which the PDCCH is located is configured by the network-side device.

Specifically, the carrier and/or the BWP on which the PDCCH is located may be carried in the configuration information, or may be carried in separate configuration information.

Step 204: Determine, based on the DCI in the PDCCH, a carrier and/or BWP for receiving the PDSCH.

In the foregoing step 21, the step of determining a scheduling offset threshold for current use according to a preset rule includes: determining the scheduling offset threshold for current use based on the configuration information, the preset rule, and carriers and/or BWPs used for receiving the PDCCH and the PDSCH.

In some embodiments of this disclosure, the scheduling offset threshold is determined by the network-side device based on capability parameter (UE capability) information reported by the terminal. The capability parameter timeDurationForQCL (time offset information for each subcarrier spacing (subcarrier spacing) supported by the terminal) is defined in TS38.306, and defines a minimum quantity of OFDM symbols required by the terminal from receiving the PDCCH to applying the QCL information indicated by the DCI in the PDCCH to the PDSCH scheduled by the PDCCH. The terminal needs to report the time offset information corresponding to each subcarrier spacing (for example, 60 kHz and 120 kHz) to the network-side device.

In TS38.331, the network-side device sends the configuration information to the terminal by using higher-layer signaling, where the configuration information includes a scheduling offset threshold corresponding to the subcarrier spacing reported by the terminal, and the scheduling offset threshold is obtained based on the time offset information. The scheduling offset threshold is a quantity of symbols between the last symbol for receiving the PDCCH by the UE and the first symbol for receiving the PDSCH. During this period of time, the UE needs to perform, based on the PDSCH QCL information in the DCI, QCL parameter adjustment, such as beam switching (beam switching), required for receiving the PDSCH.

After the UE learns the scheduling offset threshold, the UE compares the time offset between receiving the PDCCH and receiving the PDSCH scheduled by the PDCCH with the scheduling offset threshold for current use, determines the QCL information of the PDSCH based on the comparison result, completes, based on the determined QCL information of the PDSCH, QCL parameter adjustment, such as beam switching (beam switching), required for receiving the PDSCH, and correctly receives the PDSCH.

In some embodiments of this disclosure, the capability parameter information reported by the terminal may further include at least one of the following:

whether the terminal supports cross-carrier scheduling with a same numerology in carrier aggregation (Carrier Aggregation, CA for short);

whether the terminal supports cross-carrier scheduling with different numerologies in carrier aggregation;

whether the terminal supports cross-BWP scheduling with a same numerology; and whether the terminal supports cross-BWP scheduling with different numerologies.

In some embodiments of this disclosure, when the carrier or BWP on which the PDCCH is located and the carrier or BWP on which the PDSCH scheduled by the PDCCH is located have a same numerology, a scheduling offset threshold corresponding to the same numerology is used as the scheduling offset threshold for current use.

Figure 5:
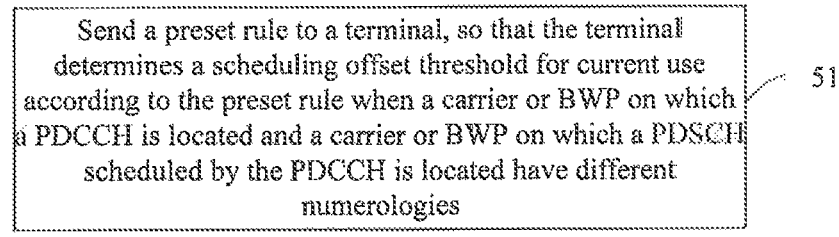
FIG. 5 is a schematic flowchart of a method for configuring a scheduling parameter according to some embodiments of this disclosure.

Referring to FIG. 5, some embodiments of this disclosure further provide a method for configuring a scheduling parameter, applied to a network-side device and including:

Step 51: Send a preset rule to a terminal, so that the terminal determines a scheduling offset threshold for current use according to the preset rule when a carrier or BWP on which a PDCCH is located and a carrier or BWP on which a PDSCH scheduled by the PDCCH is located have different numerologies.

In some embodiments of this disclosure, the network-side device sends the preset rule to the terminal, so that the terminal can determine the scheduling offset threshold for current use according to the preset rule when the network side performs cross-carrier or cross-BWP scheduling for the terminal, so as to determine QCL information of the PDSCH based on the scheduling offset threshold, and ensure correct reception of the PDSCH based on the determined QCL information of the PDSCH.

In some embodiments of this disclosure, when the numerology is configured per carrier, the preset rule includes:

using a scheduling offset threshold corresponding to the numerology of the carrier on which the PDCCH is located as the scheduling offset threshold for current use; or using a scheduling offset threshold corresponding to the numerology of the carrier on which the PDSCH is located as the scheduling offset threshold for current use; or using a scheduling offset threshold corresponding to a maximum or minimum subcarrier spacing in the numerology of the carrier on Which the PDCCH or the PDSCH is located as the scheduling offset threshold for current use.

When the numerology is configured per BWP, the preset rule includes:

using a scheduling offset threshold corresponding to the numerology of the BWP on which the PDCCH is located as the scheduling offset threshold for current use; or using a scheduling offset threshold corresponding to the numerology of the BWP on which the PDSCH is located as the scheduling offset threshold for current use; or using a scheduling offset threshold corresponding to a maximum or minimum subcarrier spacing in the numerology of the BWP on Which the PDCCH or the PDSCH is located as the scheduling offset threshold for current use;

where the numerology includes the subcarrier spacing.

The method for configuring a scheduling parameter in some embodiments of this disclosure may further include:

receiving capability parameter information of the terminal, where the capability parameter information includes time offset information corresponding to some or all subcarrier spacings supported by the terminal, and the time offset information is a minimum quantity of symbols required by the terminal to perform PDCCH reception and apply QCL information indicated by DCI in the PDCCH for the PDSCH scheduled by the PDCCH;

sending configuration information to the terminal, where the configuration information includes a scheduling offset threshold corresponding to a subcarrier spacing reported by the terminal, and the scheduling offset threshold is obtained based on the time offset information;

sending the PDCCH to the terminal, where the carrier and/or BWP on which the PDCCH is located is configured by the network-side device; and sending the PDSCH scheduled by the PDCCH to the terminal.

In some embodiments of this disclosure, when the carrier or BWP on which the PDCCH is located and the carrier or BWP on which the PDSCH scheduled by the PDCCH is located have a same numerology, a scheduling offset threshold corresponding to the same numerology is used as the scheduling offset threshold for current use.

The following describes the method for determining a scheduling parameter applied to the terminal side and the method of configuring a scheduling parameter applied to the network side with reference to an interaction process between the network side and the terminal side.

(1) The terminal reports, to the network side, the capability parameter (UE capability) information, including:
  a) related information about supporting cross-carrier or cross-BWP scheduling, such as:
    i. whether to support cross-carrier scheduling with a same numerology in carrier aggregation, for example, using a crossCarrierSameNumerology indicator;
    ii. whether to support cross-carrier scheduling with different numerologies in carrier aggregation, for example, using a crossCarrierDiffNumerology indicator;
    iii. whether to support cross-BWP scheduling with a same numerology; and
    iv. whether to support cross-BWP scheduling with different numerologies.
  b) a time offset (for example, timeDurationForQCL) of each subcarrier spacing (for example, 60 kHz and 120 kHz), that is, a minimum quantity of OFDM symbols corresponding to each numerology.

(2) The network-side device sends the configuration information to the UE by using higher-layer signaling based on the capability parameter information of the terminal, where the configuration information includes a scheduling offset threshold corresponding to each subcarrier spacing.

(3) The network-side device sends the PDCCH to the terminal for scheduling PDSCH transmission.
  a) For a terminal that supports cross-carrier scheduling, the PDCCH carries index information of a carrier and/or BWP for receiving the PDSCH.
  b) For a terminal that does not support cross-carrier scheduling, the PDCCH carries index information of a carrier and/or BWP for receiving the PDSCH.

(4) The terminal determines the scheduling offset threshold according to the preset rule.
  a) When the carrier or BWP on which the received PDCCH is located and the carrier or BWP on which the PDSCH scheduled by the PDCCH is located have different numerologies:
  When the numerology is configured per carrier, the preset rule includes:
    using a scheduling offset threshold corresponding to the numerology of the carrier on which the PDCCH is located as the scheduling offset threshold for current use; or
    using a scheduling offset threshold corresponding to the numerology of the carrier on which the PDSCH is located as the scheduling offset threshold for current use; or
    using a scheduling offset threshold corresponding to a maximum or minimum subcarrier spacing in the numerology of the carrier on which the PDCCH or the PDSCH is located as the scheduling offset threshold for current use.
  When the numerology is configured per BWP, the preset rule includes:
    using a scheduling offset threshold corresponding to the numerology of the BWP on which the PDCCH is located as the scheduling offset threshold for current use; or
    using a scheduling offset threshold corresponding to the numerology of the BP on which the PDSCH is located as the scheduling offset threshold for current use; or
    using a scheduling offset threshold corresponding to a maximum or minimum subcarrier spacing in the numerology of the BWP on which the PDCCH or the PDSCH is located as the scheduling offset threshold for current use;
  where the numerology includes the subcarrier spacing.
  b) When the carrier or BWP on which the received PDCCH is located and the carrier or BWP on which the PDSCH scheduled by the PDCCH is located have a same numerology, a scheduling offset threshold corresponding to the same numerology is used as the scheduling offset threshold for current use.

The foregoing rule may be configured by the network-side device or specified in advance by the protocol.

The UE determines the scheduling offset threshold for current use based on the configuration information, the preset rule, and carriers and/or BWPs used for receiving the PDCCH and the PDSCH.

(5) The terminal compares the time offset between receiving the PDCCH and receiving the PDSCH scheduled by the PDCCH with the scheduling offset threshold for current use, determines the QCL information of the PDSCH based on a comparison result, and then receives the PDSCH based on the QCL information of the PDSCH.

Figure 6:
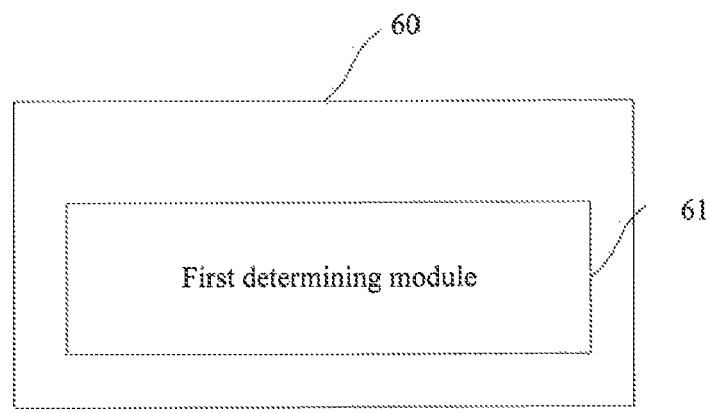
FIG. 6 is a schematic structural diagram of a terminal according to some embodiments of this disclosure.

Referring to FIG. 6, some embodiments of this disclosure provide a terminal 60, including:
  a first determining module 61, configured to determine a scheduling offset threshold for current use according to a preset rule when a carrier or BWP on which a PDCCH is located and a carrier or BWP on which a PDSCH scheduled by the PDCCH is located have different numerologies.

In some embodiments of this disclosure, when the carrier or BWP on which the PDCCH received by the terminal is located and the carrier or BWP on which the PDSCH scheduled by the PDCCH is located have different numerologies, that is, the network side performs cross-carrier or cross-BWP scheduling for the terminal, the terminal may determine the scheduling offset threshold for current use according to the preset rule, so as to determine the QCL information of the PDSCH based on the scheduling offset threshold and ensure correct reception of the PDSCH based on the determined QCL information of the PDSCH.

In some embodiments of this disclosure, when the numerology is configured per carrier, the preset rule includes:
  using a scheduling offset threshold corresponding to the numerology of the carrier on which the PDCCH is located as the scheduling offset threshold for current use; or
  using a scheduling offset threshold corresponding to the numerology of the carrier on which the PDSCH is located as the scheduling offset threshold for current use; or
  using a scheduling offset threshold corresponding to a maximum or minimum subcarrier spacing in the numerology of the carrier on which the PDCCH or the PDSCH is located as the scheduling offset threshold for current use.

When the numerology is configured per BWP, the preset rule includes;
  using a scheduling offset threshold corresponding to the numerology of the BWP on which the PDCCH is located as the scheduling offset threshold for current use; or using a scheduling offset threshold corresponding to the numerology of the BWP on which the PDSCH is located as the scheduling offset threshold for current use; or using a scheduling offset threshold corresponding to a maximum or minimum subcarrier spacing in the numerology of the BWP on which the PDCCH or the PDSCH is located as the scheduling offset threshold for current use;

In some embodiments of this disclosure, the preset rule is configured by a network-side device or specified by a protocol.

In some embodiments of this disclosure, the terminal may further include:

a second determining module, configured to compare a time offset between receiving the PDCCH and receiving the PDSCH scheduled by the PDCCH with the scheduling offset threshold for current use, and determine QCL information of the PDSCH based on a comparison result; and a first receiving module, configured to receive the PDSCH based on the QCL information of the PDSCH.

In some embodiments of this disclosure, the terminal may further include:

a reporting module, configured to report capability parameter information of the terminal to the network-side device, where the capability parameter information includes time offset information corresponding to some or all subcarrier spacings supported by the terminal, and the time offset information is a minimum quantity of symbols required by the terminal to perform PDCCH reception and apply QCL information indicated by DCI in the PDCCH for the PDSCH scheduled by the PDCCH;

a second receiving module, configured to receive configuration information from the network-side device, where the configuration information includes a scheduling offset threshold corresponding to a subcarrier spacing reported by the terminal, and the scheduling offset threshold is obtained based on the time offset information;

a third receiving module, configured to receive the PDCCH from the network-side device, where the carrier and/or BWP on which the PDCCH is located is configured by the network-side device; and a third determining module, configured to determine, based on DCI in the PDCCH, a carrier and/or BWP for receiving the PDSCH.

The first determining module is configured to determine the scheduling offset threshold for current use based on the configuration information, the preset rule, and the carriers and/or BWPs used for receiving the PDCCH and the PDSCH.

In some embodiments of this disclosure, the capability parameter information further includes at least one of the following:

whether the terminal supports cross-carrier scheduling with a same numerology in carrier aggregation;

whether the terminal supports cross-carrier scheduling with different numerologies in carrier aggregation;

whether the terminal supports cross-BWP scheduling with a same numerology; and whether the terminal supports cross-BWP scheduling with different numerologies.

In some embodiments of this disclosure, the terminal may further include:

a fourth determining module, configured to, when the carrier or BWP on which the PDCCH is located and the carrier or BWP on which the PDSCH scheduled by the PDCCH is located have a same numerology, use a scheduling offset threshold corresponding to the same numerology as the scheduling offset threshold for current use.

Figure 7:
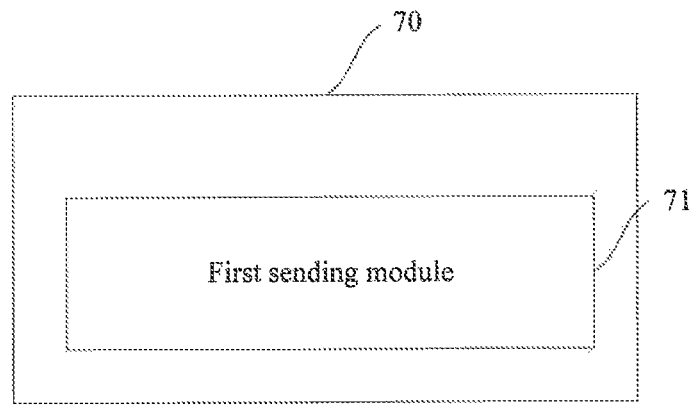
FIG. 7 is a schematic structural diagram of a network-side device according to some embodiments of this disclosure.

Referring to FIG. 7, some embodiments of this disclosure provide a network-side device 70, including:

a first sending module 71, configured to send a preset rule to a terminal, so that the terminal determines a scheduling offset threshold for current use according to the preset rule when a carrier or BWP on which a PDCCH is located and a carrier or BWP on which a PDSCH scheduled by the PDCCH is located have different numerologies.

In some embodiments of this disclosure, the network-side device sends the preset rule to the terminal, so that the terminal can determine the scheduling offset threshold for current use according to the preset rule when the network side performs cross-carrier or cross-BWP scheduling for the terminal, so as to determine QCL information of the PDSCH based on the scheduling offset threshold, and ensure correct reception of the PDSCH based on the determined QCL information of the PDSCH.

In some embodiments of this disclosure, when the numerology is configured per carrier, the preset rule includes:

using a scheduling offset threshold corresponding to the numerology of the carrier on which the PDCCH is located as the scheduling offset threshold for current use; or using a scheduling offset threshold corresponding to the numerology of the carrier on which the PDSCH is located as the scheduling offset threshold for current use; or using a scheduling offset threshold corresponding to a maximum or minimum subcarrier spacing in the numerology of the carrier on which the PDCCH or the PDSCH is located as the scheduling offset threshold for current use.

When the numerology is configured per BWP, the preset rule includes:

using a scheduling offset threshold corresponding to the numerology of the BWP on which the PDCCH is located as the scheduling offset threshold for current use; or using a scheduling offset threshold corresponding to the numerology of the BWP on which the PDSCH is located as the scheduling offset threshold for current use; or using a scheduling offset threshold corresponding to a maximum or minimum subcarrier spacing in the numerology of the MVP on which the PDCCH or the PDSCH is located as the scheduling offset threshold for current use;

where the numerology includes the subcarrier spacing.

In some embodiments of this disclosure, the network-side device may further include:

a receiving module, configured to receive capability parameter information of the terminal, where the capability parameter information includes time offset information corresponding to some or all subcarrier spacings supported by the terminal, and the time offset information is a minimum quantity of symbols required by the terminal to perform PDCCH reception and apply QCL information indicated by DCI in the PDCCH for the PDSCH scheduled by the PDCCH;

a second sending module, configured to send configuration information to the terminal, where the configuration information includes a scheduling offset threshold corresponding to a subcarrier spacing reported by the terminal, and the scheduling offset threshold is obtained based on the time offset information;

a third sending module, configured to send the PDCCH to the terminal, where the carrier and/or BWP on which the PDCCH is located is configured by the network-side device; and a fourth sending module, configured to send the PDSCH scheduled by the PDCCH to the terminal.

Optionally, the preset rule further includes:

when the carrier or BWP on which the PDCCH is located and the carrier or BWP on which the PDSCH scheduled by the PDCCH is located have a same numerology, using a scheduling offset threshold corresponding to the same numerology as the scheduling offset threshold for current use.

Figure 8:
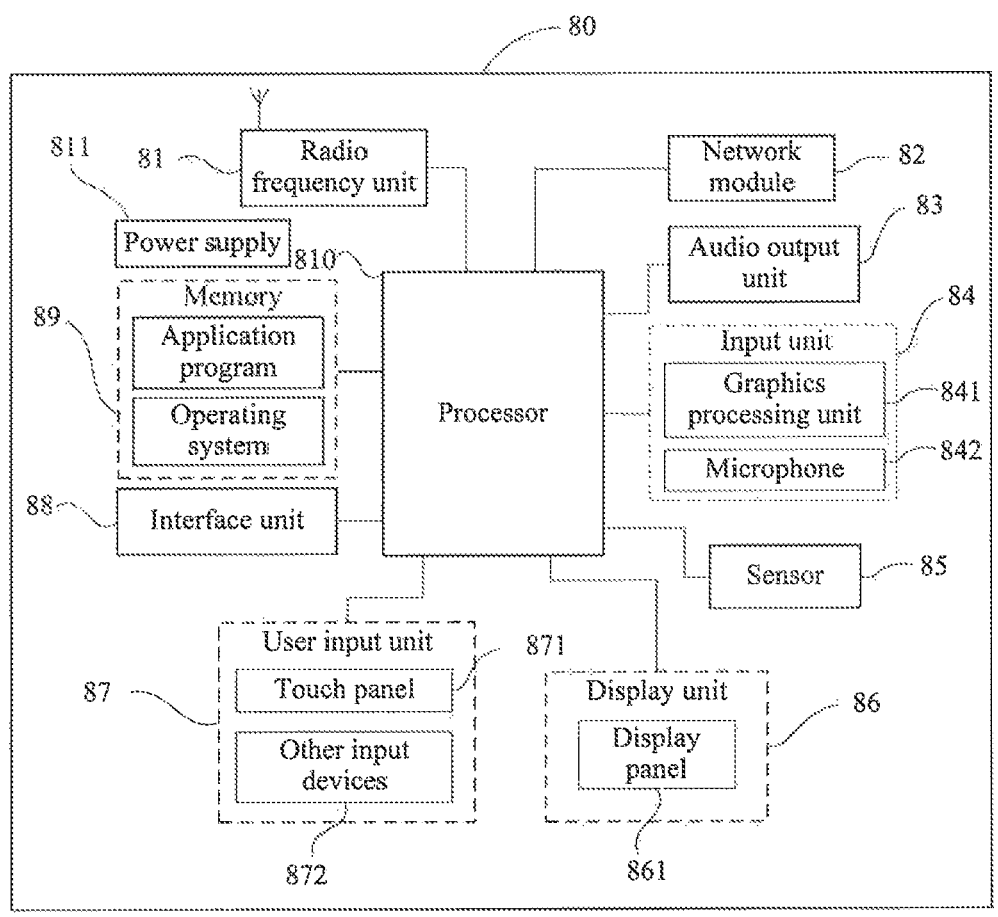
FIG. 8 is a schematic structural diagram of a terminal according to another embodiment of this disclosure.

Referring to FIG. 8, FIG. 8 is a schematic structural diagram of a terminal according to another embodiment of this disclosure. The terminal 80 includes but is not limited to components such as a radio frequency unit 81, a network module 82, an audio output unit 83, an input unit 84, a sensor 85, a display unit 86, a user input unit 87, an interface unit 88, a memory 89, a processor 810, and a power supply 811. Persons skilled in the art can understand that a structure of the terminal shown in FIG. 8 does not constitute any limitation on the terminal, and the terminal may include more or fewer components than those shown in the figure, or a combination of some components, or the components disposed differently. In some embodiment of this disclosure, the terminal includes but is not limited to a mobile phone, a tablet computer, a laptop computer, a palmtop computer, an in-vehicle terminal, a wearable device, a pedometer, and the like.

The processor 810 is configured to determine a scheduling offset threshold for current use according to a preset rule when a carrier or BWP on which a PDCCH is located and a carrier or BWP on which a PDSCH scheduled by the PDCCH is located have different numerologies.

In some embodiments of this disclosure, when the carrier or BWP on which the PDCCH received by the terminal is located and the carrier or BWP on which the PDSCH scheduled by the PDCCH is located have different numerologies, that is, the network side performs cross-carrier or cross-BWP scheduling for the terminal, the terminal may determine the scheduling offset threshold for current use according to the preset rule, so as to determine the QCL information of the PDSCH based on the scheduling offset threshold and ensure correct reception of the PDSCH based on the determined QCL information of the PDSCH.

It should be understood that in some embodiment of this disclosure, the radio frequency unit 81 may be configured to: receive and send signals in an information receiving/sending process or a call process; and specifically, after receiving downlink data from a base station, send the downlink information to the processor 810 for processing, and in addition, send uplink data to the base station. Generally, the radio frequency unit 81 includes but is not limited to an antenna, at least one amplifier, a transceiver, a coupler, a low noise amplifier, a duplexer, and the like. In addition, the radio frequency unit 81 may also communicate with a network and other devices via a wireless communications system.

The terminal provides the user with wireless broadband Internet access through the network module 82, for example, helping the user to send and receive e-mails, browse web pages, and access streaming media.

The audio output unit 83 may convert audio data received by the radio frequency unit 81 or the network module 82 or stored in the memory 89 into an audio signal and output the audio signal as a sound. Furthermore, the audio output unit 83 may also provide audio output (for example, a call signal received sound or a message received sound) related to a specific function performed by the terminal 80. The audio output unit 83 includes a speaker, a buzzer, a receiver, and the like.

The input unit 84 is configured to receive an audio or video signal. The input unit 84 may include a graphics processing unit (Graphics Processing Unit, GPU) 841 and a microphone 842. The graphics processing unit 841 processes image data of a still picture or video obtained by an image capture apparatus (such as a camera) in a video capture mode or an image capture mode. A processed image frame may be displayed on the display unit 86. The image frame processed by the graphics processing unit 841 may be stored in the memory 89 (or another storage medium) or be sent by the radio frequency unit 81 or the network module 82. The microphone 842 is capable of receiving sounds and processing such sounds into audio data. The processed audio data can be converted into a format output that can be sent to a mobile communication base station through the radio frequency unit 81 in a telephone call mode.

The terminal 80 may further include at least one sensor 85, for example, an optical sensor, a motion sensor, and another sensor. Specifically, the optical sensor may include an ambient light sensor and a proximity sensor. The ambient light sensor may adjust luminance of the display panel 861 based on brightness of ambient light, and the proximity sensor may turn off the display panel 861 and/or backlight when the terminal 80 moves close to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 85 may also include a fingerprint sensor, a pressure sensor, an iris sensor, a molecular sensor, a gyroscope, a barometer, a hygrometer, a thermometer, an infrared sensor, and the like. Details are not described herein.

The display unit 86 is configured to display information input by the user or information provided to the user. The display unit 86 may include a display panel 861, and the display panel 861 may be configured in a form of a liquid crystal display (Liquid Crystal Display, LCD), an organic light-emitting diode (Organic Light-Emitting Diode, OLED), or the like.

The user input unit 87 may be configured to receive input digit or character information and generate key signal input related to user setting and function control of the terminal. Specifically, the user input unit 87 may include a touch panel 871 and other input devices 872. The touch panel 871 is also referred to as a touchscreen and can collect a touch operation (such as an operation performed by the user on the touch panel 871 or near the touch panel 871 with a finger or by using any proper object or accessory such as a stylus) of the user on or near the touch panel 871. The touch panel 871 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 810, and can receive a command sent by the processor 810 and execute the command. In addition, the touch panel 871 may be implemented in a plurality of types, such as a resistive type, a capacitive type, an infrared type, and a surface acoustic wave type. In addition to the touch panel 871, the user input unit 87 may further include other input devices 872. Specifically, the other input devices 872 may include but are not limited to a physical keyboard, a function key (such as a volume control key or a power on/off key), a trackball, a mouse, a joystick, and the like. Details are not described herein.

Further, the touch panel 871 may cover the display panel 861. When detecting a touch operation on or near the touch panel 871, the touch panel 871 transmits the touch operation to the processor 810 to determine a type of a touch event. Then, the processor 810 provides a corresponding visual output on the display panel 861 based on the type of the touch event. Although in FIG. 8, the touch panel 871 and the display panel 861 act as two independent parts to implement input and output functions of the terminal, in some embodiments, the touch panel 871 and the display panel 861 may be integrated to implement the input and output functions of the terminal. This is not specifically limited herein.

The interface unit 88 is an interface between an external apparatus and the terminal 80. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 88 may be configured to: receive input (for example, data information and power) from the external apparatus, and transmit the received input to one or more elements in the terminal 80, or may be configured to transmit data between the terminal 80 and the external apparatus.

The memory 89 may be configured to store software programs and various data. The memory 89 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 89 may include a high-speed random access memory, and may further include a non-volatile memory such as a disk storage device, a flash memory device, or other volatile solid-state storage devices.

The processor 810 is a control center of the terminal, and is connected to all components of the terminal by using various interfaces and lines. By running or executing a software program and/or module that is stored in the memory 89 and calling data stored in the memory 89, the processor 810 executes various functions of the terminal and processes data, so as to perform overall monitoring on the terminal. The processor 810 may include one or more processing units. Optionally, an application processor and a modem processor may be integrated in the processor 810. The application processor primarily processes an operating system, user interfaces, application programs, and the like. The modem processor primarily processes radio communication. It can be understood that the modem processor may alternatively be not integrated in the processor 810.

The terminal 80 may further include a power supply 811 (such as a battery) that supplies power to components.

Optionally, the power supply 811 may be logically connected to the processor 810 through a power management system. In this way, functions such as charge management, discharge management, and power consumption management are implemented by using the power management system.

In addition, the terminal 80 includes some functional modules that are not shown. Details are not described herein.

Figure 9:
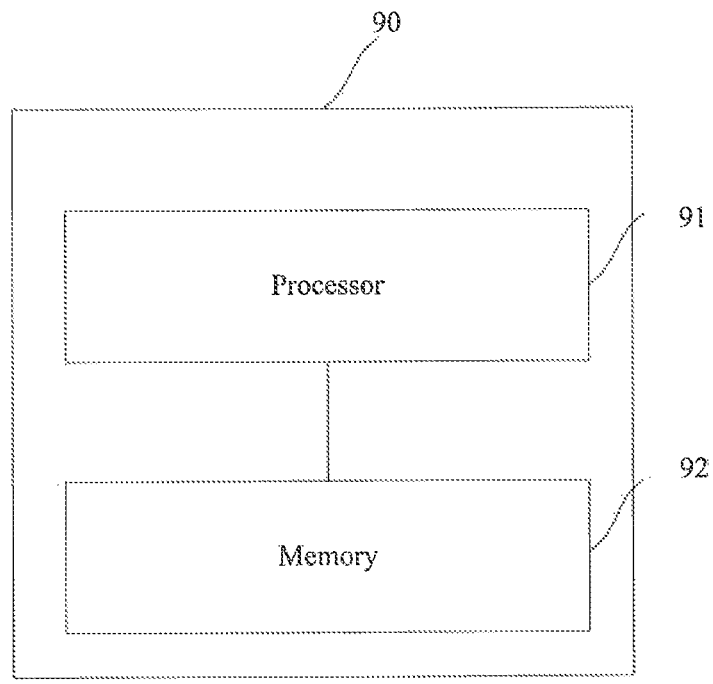
FIG. 9 is a schematic structural diagram of a terminal according to still another embodiment of this disclosure.

Referring to FIG. 9, FIG. 9 is a schematic structural diagram of a terminal according to still another embodiment of this disclosure. The terminal 90 includes a processor 91 and a memory 92. In some embodiment of this disclosure, the terminal 90 further includes a computer program stored in the memory 92 and capable of running on the processor 91. When the computer program is executed by the processor 91, the following step is implemented: determining a scheduling offset threshold for current use according to a preset rule when a carrier or BWP on which a PDCCH is located and a carrier or BWP on which a PDSCH scheduled by the PDCCH is located have different numerologies.

The processor 91 is responsible for management of the bus architecture and general processing, and the memory 92 is capable of storing data that is used by the processor 91 during operation.

Optionally, when the numerology is configured per carrier, the preset rule includes:
  using a scheduling offset threshold corresponding to the numerology of the carrier on which the PDCCH is located as the scheduling offset threshold for current use; or
  using a scheduling offset threshold corresponding to the numerology of the carrier on which the PDSCH is located as the scheduling offset threshold for current use; or
  using a scheduling offset threshold corresponding to a maximum or minimum subcarrier spacing in the numerology of the carrier on which the PDCCH or the PDSCH is located as the scheduling offset threshold for current use.

When the numerology is configured per BWP, the preset rule includes:
  using a scheduling offset threshold corresponding to the numerology of the IMP on which the PDCCH is located as the scheduling offset threshold for current use; or
  using a scheduling offset threshold corresponding to the numerology of the IMP on which the PDSCH is located as the scheduling offset threshold for current use; or
  using a scheduling offset threshold corresponding to a maximum or minimum subcarrier spacing in the numerology of the BWP on which the PDCCH or the PDSCH is located as the scheduling offset threshold for current use;
  where the numerology includes the subcarrier spacing.

Optionally, the preset rule is configured by a network-side device or is specified by a protocol.

Optionally, when the computer program is executed by the processor 91, the following steps can be further implemented:
  comparing a time offset between receiving the PDCCH and receiving the PDSCH scheduled by the PDCCH with the scheduling offset threshold for current use, and determining QCL information of the PDSCH based on a comparison result; and
  receiving the PDSCH based on the QCL information of the PDSCH.

Optionally, when the computer program is executed by the processor 91, the following steps can be further implemented:

reporting capability parameter information of the terminal to the network-side device, where the capability parameter information includes time offset information corresponding to some or all subcarrier spacings supported by the terminal, and the time offset information is a minimum quantity of symbols required by the terminal to perform PDCCH reception and apply QCL information indicated by DCI in the PDCCH for the PDSCH scheduled by the PDCCH;

receiving configuration information from the network-side device, where the configuration information includes a scheduling offset threshold corresponding to a subcarrier spacing reported by the terminal, and the scheduling offset threshold is obtained based on the time offset information;

receiving the PDCCH from the network-side device, where the carrier and/or BWP on which the PDCCH is located is configured by the network-side device; and determining, based on the DCI in the PDCCH, a carrier and/or BWP for receiving the PDSCH.

The step of determining a scheduling offset threshold for current use according to a preset rule includes:

determining the scheduling offset threshold for current use based on the configuration information, the preset rule, and carriers and/or BWPs used for receiving the PDCCH and the PDSCH.

Optionally, the capability parameter information further includes at least one of the following:

whether the terminal supports cross-carrier scheduling with a same numerology in carrier aggregation;

whether the terminal supports cross-carrier scheduling with different numerologies in carrier aggregation;

whether the terminal supports cross-BWP scheduling with a same numerology; and whether the terminal supports cross-BWP scheduling with different numerologies.

Optionally, when the computer program is executed by the processor 91, the following steps can be further implemented:

when the carrier or BWP on which the PDCCH is located and the carrier or BWP on which the PDSCH scheduled by the PDCCH is located have a same numerology, using a scheduling offset threshold corresponding to the same numerology as the scheduling offset threshold for current use.

Figure 10:
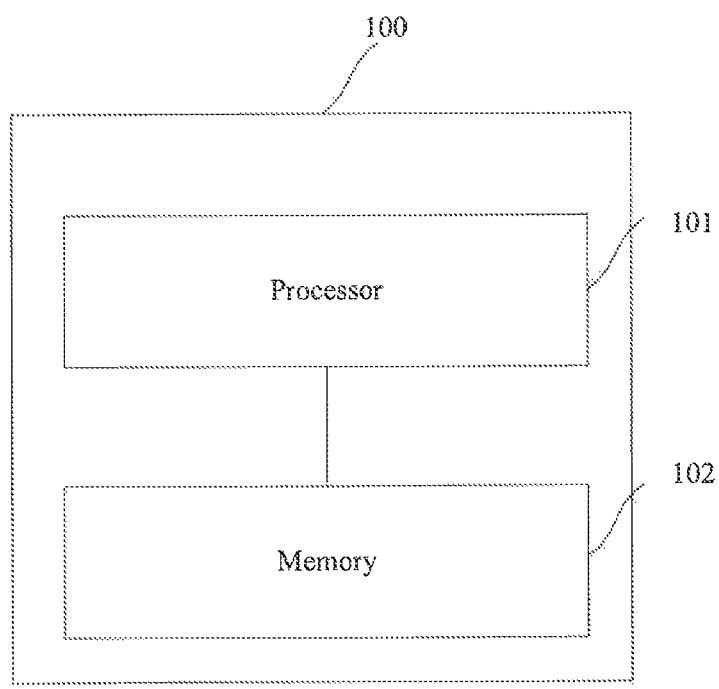
FIG. 10 is a schematic structural diagram of a network-side device according to still another embodiment of this disclosure.

Referring to FIG. 10, FIG. 10 is a schematic structural diagram of a network-side device according to still another embodiment of this disclosure. The network-side device 100 includes a processor 101 and a memory 102. In some embodiment of this disclosure, the network-side device 100 further includes a computer program stored in the memory 102 and capable of running on the processor 101. When the computer program is executed by the processor 101, the following step is implemented: sending a preset rule to a terminal, so that the terminal determines a scheduling offset threshold for current use according to the preset rule when a carrier or BWP on which a PDCCH is located and a carrier or BWP on which a PDSCH scheduled by the PDCCH is located have different numerologies.

The processor 101 is responsible for management of the bus architecture and general processing, and the memory 102 is capable of storing data that is used by the processor 101 during operation.

Optionally, when the numerology is configured per carrier, the preset rule includes:

using a scheduling offset threshold corresponding to the numerology of the carrier on which the PDCCH is located as the scheduling offset threshold for current use; or using a scheduling offset threshold corresponding to the numerology of the carrier on which the PDSCH is located as the scheduling offset threshold for current use; or using a scheduling offset threshold corresponding to a maximum or minimum subcarrier spacing in the numerology of the carrier on which the PDCCH or the PDSCH is located as the scheduling offset threshold for current use.

When the numerology is configured per IMP, the preset rule includes;

using a scheduling offset threshold corresponding to the numerology of the BWP on which the PDCCH is located as the scheduling offset threshold for current use; or using a scheduling offset threshold corresponding to the numerology of the BWP on which the PDSCH is located as the scheduling offset threshold for current use; or using a scheduling offset threshold corresponding to a maximum or minimum subcarrier spacing in the numerology of the BWP on which the PDCCH or the PDSCH is located as the scheduling offset threshold for current use.

Optionally, when the computer program is executed by the processor 101, the following steps can be further implemented:

receiving capability parameter information of the terminal, where the capability parameter information includes time offset information corresponding to some or all subcarrier spacings supported by the terminal, and the time offset information is a minimum quantity of symbols required by the terminal to perform PDCCH reception and apply QCL information indicated by DCI in the PDCCH for the PDSCH scheduled by the PDCCH;

sending configuration information to the terminal, where the configuration information includes a scheduling offset threshold corresponding to a subcarrier spacing reported by the terminal, and the scheduling offset threshold is obtained based on the time offset information;

sending the PDCCH to the terminal, where the carrier and/or BWP on which the PDCCH is located is configured by the network-side device; and sending the PDSCH scheduled by the PDCCH to the terminal.

Optionally, the preset rule further includes:

when the carrier or BWP on which the PDCCH is located and the carrier or BWP on which the PDSCH scheduled by the PDCCH is located have a same numerology, using a scheduling offset threshold corresponding to the same numerology as the scheduling offset threshold for current use.

Some embodiments of this disclosure further provide a computer-readable storage medium, where a computer program is stored in the computer-readable storage medium. When the computer program is executed by a processor, processes of the foregoing method embodiment for determining a scheduling parameter are implemented, with the same technical effect achieved. To avoid repetition, details are not described herein again.

Some embodiments of this disclosure further provide a computer-readable storage medium, where a computer program is stored in the computer-readable storage medium. When the computer program is executed by a processor, processes of the foregoing method embodiment for configuring a scheduling parameter are implemented, with the same technical effect achieved. To avoid repetition, details are not described herein again.

The computer-readable storage medium is, for example, a read-only memory (Read-Only Memory, ROM for short), a random access memory (Random Access Memory, RAM for short), a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the embodiments, a person skilled in the art may clearly understand that the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific embodiments. The foregoing specific embodiments are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for determining a scheduling parameter, applied to a terminal and comprising:
   in response to a carrier or a bandwidth part (BWP) on which a physical downlink control channel (PDCCH) is located and a carrier or a BWP on which a physical downlink shared channel (PDSCH) scheduled by the PDCCH is located having different numerologies (numerology), determining a scheduling offset threshold for current use according to a preset rule;
   wherein before determining a scheduling offset threshold for current use according to a preset rule, the method further comprises:
   reporting capability parameter information of the terminal to a network-side device, wherein the capability parameter information comprises time offset information corresponding to some or all subcarrier spacings supported by the terminal, and the time offset information is a minimum quantity of symbols required by the terminal to perform PDCCH reception and apply QCL information indicated by downlink control information (DCI) in the PDCCH for the PDSCH scheduled by the PDCCH;
   receiving configuration information from the network-side device, wherein the configuration information comprises a scheduling offset threshold corresponding to a subcarrier spacing reported by the terminal, and the scheduling offset threshold is obtained based on the time offset information;
   receiving the PDCCH from the network-side device, wherein the carrier and/or BWP on which the PDCCH is located is configured by the network-side device; and
   determining, based on the DCI in the PDCCH, a carrier and/or BWP for receiving the PDSCH; and
   wherein determining a scheduling offset threshold for current use according to a preset rule comprises:
   determining the scheduling offset threshold for current use based on the configuration information, the preset rule, and carriers and/or BWPs used for receiving the PDCCH and the PDSCH.

2. The method for determining a scheduling parameter according to claim 1, wherein
   in response to the numerology being configured per carrier, the preset rule comprises:
   using a scheduling offset threshold corresponding to the numerology of the carrier on which the PDCCH is located as the scheduling offset threshold for current use; or
   using a scheduling offset threshold corresponding to the numerology of the carrier on which the PDSCH is located as the scheduling offset threshold for current use; or
   using a scheduling offset threshold corresponding to a maximum or minimum subcarrier spacing in the numerology of the carrier on which the PDCCH or the PDSCH is located as the scheduling offset threshold for current use; and
   in response to the numerology being configured per BWP, the preset rule comprises:
   using a scheduling offset threshold corresponding to the numerology of the BWP on which the PDCCH is located as the scheduling offset threshold for current use; or
   using a scheduling offset threshold corresponding to the numerology of the MVP on which the PDSCH is located as the scheduling offset threshold for current use; or
   using a scheduling offset threshold corresponding to a maximum or minimum subcarrier spacing in the numerology of the BWP on which the PDCCH or the PDSCH is located as the scheduling offset threshold for current use;
   wherein the numerology comprises the subcarrier spacing.

3. The method for determining a scheduling parameter according to claim 1, wherein the preset rule is configured by a network-side device or is specified by a protocol.

4. The method for determining a scheduling parameter according to claim 1, after the step of determining a scheduling offset threshold for current use according to a preset rule, further comprising:
   comparing a time offset between receiving the PDCCH and receiving the PDSCH scheduled by the PDCCH with the scheduling offset threshold for current use, and determining quasi-co-location (QCL) information of the PDSCH based on a comparison result; and receiving the PDSCH based on the QCL information of the PDSCH.

5. The method for determining a scheduling parameter according to claim 1, wherein the capability parameter information further comprises at least one of the following:
whether the terminal supports cross-carrier scheduling with a same numerology in carrier aggregation;
whether the terminal supports cross-carrier scheduling with different numerologies in carrier aggregation;
whether the terminal supports cross-BWP scheduling with a same numerology; and
whether the terminal supports cross-BWP scheduling with different numerologies.

6. The method for determining a scheduling parameter according to claim 1, further comprising:
in response to the carrier or BWP on which the PDCCH is located and the carrier or BWP on which the PDSCH scheduled by the PDCCH is located having a same numerology, using a scheduling offset threshold corresponding to the same numerology as the scheduling offset threshold for current use.

7. A terminal, comprising a processor, a memory, and a computer program stored in the memory and capable of running on the processor, wherein when the computer program is executed by the processor, the steps of the method for determining a scheduling parameter are implemented, the method comprising:
in response to a carrier or a bandwidth part (BWP) on which a physical downlink control channel (PDCCH) is located and a carrier or a BWP on which a physical downlink shared channel (PDSCH) scheduled by the PDCCH is located having different numerologies (numerology), determining a scheduling offset threshold for current use according to a preset rule;
wherein before determining a scheduling offset threshold for current use according to a preset rule, the method further comprises:
reporting capability parameter information of the terminal to a network-side device, wherein the capability parameter information comprises time offset information corresponding to some or all subcarrier spacings supported by the terminal, and the time offset information is a minimum quantity of symbols required by the terminal to perform PDCCH reception and apply QCL information indicated by downlink control information (DCI) in the PDCCH for the PDSCH scheduled by the PDCCH;
receiving configuration information from the network-side device, wherein the configuration information comprises a scheduling offset threshold corresponding to a subcarrier spacing reported by the terminal, and the scheduling offset threshold is obtained based on the time offset information;
receiving the PDCCH from the network-side device, wherein the carrier and/or BWP on which the PDCCH is located is configured by the network-side device; and
determining, based on the DCI in the PDCCH, a carrier and/or BWP for receiving the PDSCH; and
wherein determining a scheduling offset threshold for current use according to a preset rule comprises:
determining the scheduling offset threshold for current use based on the configuration information, the preset rule, and carriers and/or BWPs used for receiving the PDCCH and the PDSCH.

8. The terminal according to claim 7, wherein
in response to the numerology being configured per carrier, the preset rule comprises:
using a scheduling offset threshold corresponding to the numerology of the carrier on which the PDCCH is located as the scheduling offset threshold for current use; or
using a scheduling offset threshold corresponding to the numerology of the carrier on which the PDSCH is located as the scheduling offset threshold for current use; or
using a scheduling offset threshold corresponding to a maximum or minimum subcarrier spacing in the numerology of the carrier on which the PDCCH or the PDSCH is located as the scheduling offset threshold for current use; and
in response to the numerology configured per BWP, the preset rule comprises:
using a scheduling offset threshold corresponding to the numerology of the BWP on which the PDCCH is located as the scheduling offset threshold for current use; or
using a scheduling offset threshold corresponding to the numerology of the BWP on which the PDSCH is located as the scheduling offset threshold for current use; or
using a scheduling offset threshold corresponding to a maximum or minimum subcarrier spacing in the numerology of the BWP on which the PDCCH or the PDSCH is located as the scheduling offset threshold for current use;
wherein the numerology comprises the subcarrier spacing.

9. The terminal according to claim 7, wherein the preset rule is configured by a network-side device or is specified by a protocol.

10. The terminal according to claim 7, wherein after the step of determining a scheduling offset threshold for current use according to a preset rule, the method implemented when the computer program is executed by the processor further comprises:
comparing a time offset between receiving the PDCCH and receiving the PDSCH scheduled by the PDCCH with the scheduling offset threshold for current use, and determining quasi-co-location (QCL) information of the PDSCH based on a comparison result; and
receiving the PDSCH based on the QCL information of the PDSCH.

11. The terminal according to claim 7, wherein the capability parameter information further comprises at least one of the following:
whether the terminal supports cross-carrier scheduling with a same numerology in carrier aggregation;
whether the terminal supports cross-canter scheduling with different numerologies in carrier aggregation;
whether the terminal supports cross-BWP scheduling with a same numerology; and
whether the terminal supports cross-BWP scheduling with different numerologies.

12. The terminal according to claim 7, wherein the method implemented when the computer program is executed by the processor further comprises:
in response to the carrier or BWP on which the PDCCH is located and the carrier or BWP on which the PDSCH scheduled by the PDCCH is located having a same numerology, using a scheduling offset threshold corresponding to the same numerology as the scheduling offset threshold for current use.

13. A network-side device, comprising a processor, a memory, and a computer program stored in the memory and capable of running on the processor, wherein when the computer program is executed by the processor, the steps of a method for configuring a scheduling parameter are implemented, the method comprising:
   sending a preset rule to a terminal, so that the terminal determines a scheduling offset threshold for current use according to the preset rule, in response to a carrier or a bandwidth part (BWP) on which a physical downlink control channel (PDCCH) is located and a carrier or a BWP on which a physical downlink shared channel (PDSCH) scheduled by the PDCCH is located having different numerologies (numerology);
   wherein the method implemented when the computer program is executed by the processor, further comprising:
   receiving capability parameter information of the terminal, wherein the capability parameter information comprises time offset information corresponding to some or all subcarrier spacings supported by the terminal, and the time offset information is a minimum quantity of symbols required by the terminal to perform PDCCH reception and apply quasi-co-location (QCL) information indicated by downlink control information (DCI) in the PDCCH for the PDSCH scheduled by the PDCCH;
   sending configuration information to the terminal, wherein the configuration information comprises a scheduling offset threshold corresponding to a subcarrier spacing reported by the terminal, and the scheduling offset threshold is obtained based on the time offset information;
   sending the PDCCH to the terminal, wherein the carrier and/or BWP on which the PDCCH is located is configured by the network-side device; and
   sending the PDSCH scheduled by the PDCCH to the terminal.

14. The network-side device according to claim 13, wherein in the method implemented when the computer program is executed by the processor,
   in response to the numerology being configured per carrier, the preset rule comprises:
   using a scheduling offset threshold corresponding to the numerology of the carrier on which the PDCCH is located as the scheduling offset threshold for current use; or
   using a scheduling offset threshold corresponding to the numerology of the carrier on which the PDSCH is located as the scheduling offset threshold for current use; or
   using a scheduling offset threshold corresponding to a maximum or minimum subcarrier spacing in the numerology of the carrier on which the PDCCH or the PDSCH is located as the scheduling offset threshold for current use; and
   in response to the numerology being configured per BWP, the preset rule comprises:
   using a scheduling offset threshold corresponding to the numerology of the BWP on which the PDCCH is located as the scheduling offset threshold for current use; or
   using a scheduling offset threshold corresponding to the numerology of the BWP on which the PDSCH is located as the scheduling offset threshold for current use; or
   using a scheduling offset threshold corresponding to a maximum or minimum subcarrier spacing in the numerology of the BWP on which the PDCCH or the PDSCH is located as the scheduling offset threshold for current use;
   wherein the numerology comprises the subcarrier spacing.

15. The network-side device according to claim 13, wherein in the method implemented when the computer program is executed by the processor, the preset rule further comprises:
   in response to the carrier or BWP on which the PDCCH is located and the carrier or BWP on which the PDSCH scheduled by the PDCCH is located having a same numerology, using a scheduling offset threshold corresponding to the same numerology as the scheduling offset threshold for current use.

16. A non-transitory computer-readable storage medium, wherein a computer program is stored in the computer-readable storage medium, and when the computer program is executed by a processor, the steps of the method for determining a scheduling parameter according to claim 1 are implemented.

* * * * *